US009354951B2

(12) United States Patent
Li et al.

(10) Patent No.: US 9,354,951 B2
(45) Date of Patent: May 31, 2016

(54) METHOD AND DEVICE FOR BROWSING WEBPAGE

(71) Applicant: BEIJING QIHOO TECHNOLOGY COMPANY LIMITED, Xicheng, Beijing (CN)

(72) Inventors: Jinwei Li, Beijing (CN); Zhi Chen, Beijing (CN); Huan Ren, Beijing (CN)

(73) Assignee: Beijing Qihoo Technology Company Limited, Xicheng District, Beijing (CN)

( * ) Notice: Subject to any disclaimer, the term of this patent is extended or adjusted under 35 U.S.C. 154(b) by 25 days.

(21) Appl. No.: 14/368,588

(22) PCT Filed: Dec. 26, 2012

(86) PCT No.: PCT/CN2012/087557
§ 371 (c)(1),
(2) Date: Jun. 25, 2014

(87) PCT Pub. No.: WO2013/097725
PCT Pub. Date: Jul. 4, 2013

(65) Prior Publication Data
US 2015/0089512 A1   Mar. 26, 2015
US 2015/0309851 A9   Oct. 29, 2015

(30) Foreign Application Priority Data

Dec. 28, 2011   (CN) .......................... 2011 1 0448359

(51) Int. Cl.
*G06F 3/00*     (2006.01)
*G06F 15/173*   (2006.01)
*G06F 9/54*     (2006.01)
(Continued)

(52) U.S. Cl.
CPC ................ *G06F 9/546* (2013.01); *G06F 9/542* (2013.01); *G06F 17/3089* (2013.01); *H04L 63/10* (2013.01)

(58) Field of Classification Search
CPC ............ G06F 9/54; G06F 9/546; H04L 63/10
USPC .......................................... 719/310; 709/224
See application file for complete search history.

(56) References Cited

U.S. PATENT DOCUMENTS

| 7,254,814 B1 * | 8/2007 | Cormier .............. G06F 9/44526 717/120 |
| 2003/0088696 A1 * | 5/2003 | McCanne ........... H04L 12/1836 709/238 |

(Continued)

OTHER PUBLICATIONS

Sachiko, Security Model for the Client-Side Web Application Environments, May 24, 2007.*

(Continued)

*Primary Examiner* — Lechi Truong
(74) *Attorney, Agent, or Firm* — James M. Stipek; Polsinelli PC

(57) ABSTRACT

The present invention discloses a method and device for browsing webpage, wherein the method including: creating a plugin/control process independent from a page process for a plugin/control object when a page thread creates the plugin/control object; and placing the independent plugin/control process into a sandbox to run; browsing a webpage by implementing inter-process communication between the plugin/control process and the page process; wherein the page process running outside the sandbox. According to the invention, the web browsing security is guaranteed, and meanwhile the running stability of the browser is enhanced.

7 Claims, 3 Drawing Sheets

(51) Int. Cl.
  *H04L 29/06* (2006.01)
  *G06F 17/30* (2006.01)

(56) References Cited

U.S. PATENT DOCUMENTS

2007/0260702 A1* 11/2007 Richardson ....... G06F 17/30861
                                                    709/217
2011/0258526 A1* 10/2011 Supakkul ............ G06F 17/3089
                                                    715/230
2012/0304286 A1* 11/2012 Croll .................... G06F 21/6263
                                                    726/22
2014/0351889 A1* 11/2014 Liu ........................ H04L 63/10
                                                    726/3

OTHER PUBLICATIONS

English translation of Abstract only of Chinese Application No. CN102232217A, Publication date Nov. 2, 2011, country: China, Inventors: Yogesh Shah Nirav et al, Title: Sandboxed execution of plug-ins, one page.

International Search Report regarding PCT/CN2012/087557 issued Apr. 4, 2013, 4 pages.

* cited by examiner

METHOD AND DEVICE FOR BROWSING WEBPAGE

FIELD OF THE INVENTION

The present disclosure relates to the browser security field, and in particular to a method and device for browsing webpage.

BACKGROUND OF THE INVENTION

With the development of the times, Internet has become an important part of people's lives, and Web browser has also definitely become one of the most important softwares in computers and other equipments. Browser provides BHO (Browser Helper Object), AxtiveX control, toolbar component interfaces, which may customize and perfect the function of the browser in the form of plugin/control.

However, with the increasing importance of Web browser, cyber attacks such as Malicious software, Trojan, spyware etc appear in a gradual rise trend, especially for browser plugins, since the plugin/control software programs are published by different issuers, their qualities are not guaranteed, and there often exist some security vulnerability, so it is easy to become the key target of Trojan, viruses.

For example, studies found: some common plugins such as Adobe Flash, Windows Media Player, Real player and so on are highly vulnerable to attack. Utilizing the vulnerabilities of browser plugin, viruses may acquire the user's system permissions, and download, install, run malicious code to the user's computer to steal personal information such as online banking information, e-mail or games' password and so on, and then bring about serious impact on the user's system security.

In addition, some plugins such as Adware or Spyware and so on themselves are malicious plugins. Such malicious plugins may monitor the user's online behaviors, and report the recorded data to plug creator in order to achieve some illegal purposes, such as advertising, stealing password of game or bank account.

In order to improve the surfing security of users, it is common to combine the browser technology with sandbox technology. The sandbox is a virtual system program, which provides an isolation mechanism to run programs with virtualized disk, memory and cyber source. All files and registry contents which are created, modified and deleted by the programs running in the sandbox will be virtually redirected so as to ensure that the programs can't amend the key parts of the system and destruct the real environment of the system.

In the prior art, the browser process is usually directly placed into the sandbox to run, thus the surfing security of users would be guaranteed to some extent. However, due to the limitation of the plugin/control on the design level, when running, some instability phenomenon such as stuck, crash of plugin/control will appear, which result in the loss of response for the entire page process, and then affect the stability of the browser.

Therefore, it will be an urgent need for those skilled in the art to solve the technical problem of enhancing the stability of browser while ensuring the security of Internet browsing.

SUMMARY OF THE INVENTION

In view of the above problems, the present invention is proposed to provide a method and device for browsing webpage, which overcome all of the above problems or at least in part solve or mitigate the above problems.

According to one aspect of the present invention, there is provided a method for browsing webpage, comprising:

Creating a plugin/control process which is independent from a page process for a plugin/control object when a page thread creates the plugin/control object;

Placing the independent plugin/control process into a sandbox to run;

Browsing a webpage by implementing inter-process communication between the plugin/control process and the page process; wherein the page process running outside the sandbox.

According to another aspect of the present invention, there is provided a device for browsing webpage, comprising:

Independent process creation unit, configured to create a plugin/control process which is independent from a page process for a plugin/control object when a page thread creates the plugin/control object;

Sandbox driving unit, configured to place the independent plugin/control process into the sandbox to run;

Inter-process communication unit, configured to browse a webpage by implementing inter-process communication between the plugin/control process and the page process.

According to still another aspect of the present invention, there is provided a computer program comprising a computer readable code which causes the server to perform the browsing webpage method as claimed in claims 1-5 when the computer readable code is running on the server.

According to a further aspect of the present invention, a computer readable medium storing therein a computer program as claimed in claim 11.

The beneficial effects of the present invention lie in that:

According to the technical solution of the invention, since making the plugin/control independent from the page process, and furthermore placing the plugin/control process into the sandbox to run in real time, therefore avoiding the unresponsive phenomena of browser page caused by plugin/control getting stuck or crashing, meanwhile guaranteeing the surfing safety of the users, and finally enhancing the running stability of the browser.

The above description is only an overview of the technical solutions of the present invention. In order to be able to more clearly understand the technical means of the present invention to implement it according to the content of the specification, and for the above and other objects, features and advantages of the present invention to be more apparent. the embodiments of the present invention will be illustrated in the following.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the present invention. And throughout the drawings, like reference signs are used to denote like components. In the drawings.

DETAILED DESCRIPTION OF THE INVENTION

In the following the invention will be further described in connection with the drawings and the particular embodiments.

First of all, during the process of implementing the present invention, the inventor found that, in the traditional implementations, the plugin/control and page are in one and the same process, when malicious program or plugin is loaded in the browser process through BHO, AxtiveX controls, toolbar components, etc., such object will run in the same context with the browser, and may perform any actions on the active windows and modules. For example, a BHO may detect typical events, such as GoBack, GoForward, DocumentComplete etc. In addition, the BHO not only may access to the browser's menus and toolbars to make changes, but also may generate a new window to display additional information about the current page, and may install some hooks to monitor some messages and actions, which may be a risk for the user's system security. On the other hand, because the plugin/control and the page are in one and the same process, which will result in unresponsive of the entire page process when the plug/control getting stuck, crashing or being in other unstable situations, and thus will influence the stability of the browser.

Based on the above analysis, the embodiments of the present invention seek to provide a new method for browsing webpage, through which method the web browsing security is guaranteed, and meanwhile the running stability of the browser is enhanced.

Figure 1:
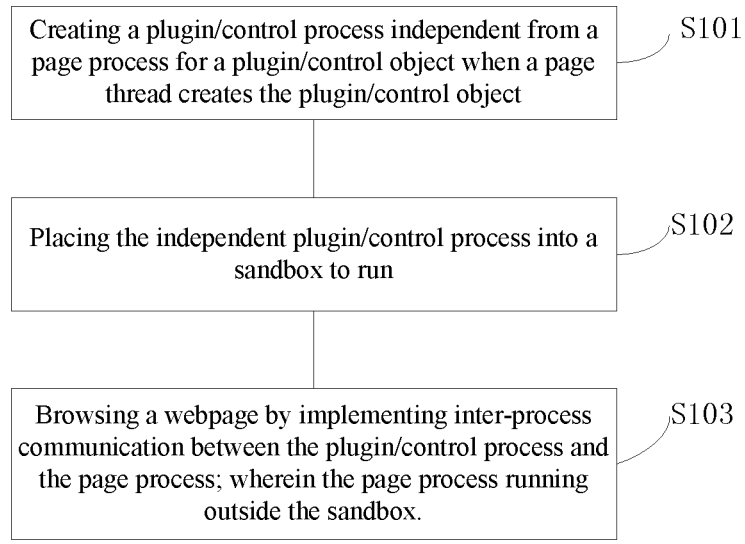
FIG. 1 shows schematically a flow chart of a method according to one embodiment of the invention.

Referring to FIG. 1, the method for browsing webpage according the embodiment of the invention comprising the following steps:

S101: Creating a plugin/control process independent from a page process for a plugin/control object when a page thread creates the plugin/control object;

In general, if there is a plugin in a page, the page process will create a plugin/control object in the process of loading the page. In the traditional manner, the plugin/control object will be created directly in the page process. However, in an embodiment of the invention, when the page process creates the plugin/control object, plugin/control process independent from the page process can be created for the plugin/control object. Namely, the plugin/control and page are in different processes, so that even the plugin gets stuck or crashes, it will not make the page unresponsive for the reason that the plugin would not affect the operation of other processes, and will avoid influencing the stability of the browser.

S102: Placing the independent plugin/control process into a sandbox to run;

Since the plugin/control has large possibility to be attacked by Trojan or virus, therefore, in the embodiment of the invention, placing the independent process created for the plugin/control object into the sandbox to run so as to avoid threat to the users' system security caused by plugin/control.

S103: Browsing a webpage by implementing inter-process communication between the plugin/control process and the page process; wherein the page process running outside the sandbox.

As a functional supplement or improvement to the browser, the plugin/control needs to cooperate with the page to implement some browser function. In the embodiment of the invention, since the page and the plugin/control are in different processes, therefore it is necessary to exchange information between the page and the plugin/control so as to realize some browser functions. Here the so-called information exchange includes two cases: one is that the page process needs to send messages to the plugin/control process, the other is that the plugin/control process needs to send messages to the page process.

In order to ensure that the page process could send messages to the plugin/control process, when making the plugin independent from the browser page process and placing the plugin/control process into the sandbox, meanwhile it is also needed to create a main window object and a browser host object in independent plugin/control process, and then connect the browser host object to the main window object. Since the information exchange in operating system is based on windows, after creating the main window object in the plugin/control process and connecting the main window object to the browser host object, the page may send messages to the main window of the plugin/control when the page needs to send messages to the plugin/control, so that the plugin/control process can receive messages sent by the page process via the main window.

In the specific implementation process, the page process may send messages to the plugin/control process in many instances. For example, the browser process can take over the mouse, keyboard or other response events from the plugin/control process, and inform the plugin process in the sandbox by the message forwarding mechanism, then the plugin/control process will implement the corresponding operation. Such mouse or keyboard response events specifically include: when the page process object changes the window size, refreshes the page etc., the page process may inform the plugin/control process object to adjust the size and position etc. of the plugin, or inform the plugin/control process to complete the release and destruction operations of the plugin/control object when the page is closed or the browser exits.

In order to make the plugin/control process be capable of sending messages to the page process, it is unnecessary to create a window object for the page process because the page process itself has window object. However, in the embodiment of the invention, since the plugin/control process is in the sandbox but the browser page process is outside the sandbox, if the plugin/control process in the sandbox needs to communicate with the browser page process outside the sandbox, operation instructions of plugin/control process to the outside of the sandbox will be shielded by virtual environment of the sandbox due to the security limitations of the sandbox. Therefore, special treatment should be done to the sandbox so that some necessary operation instructions from plugins/control process could be sent out to inform the browser page process outside the sandbox. Meanwhile the outside browser page process can also send some user's operation instructions (such as user clicks a link, or clicks "Stop", "Play" button, etc.) to the plugins/control process in the sandbox to implement the Corresponding process.

Of course, in order to ensure safety, not all the messages from plugin/control process can be sent to the outside of the sandbox. Therefore, a necessary instruction set can be pre-defined, and the instructions which are pre-defined in the set and sent from the plugin/control process could be let out by the sandbox to ensure the normal operation of the browser. In other words, in order to ensure the normal operation of the browser, some instructions are allowed to be sent to the outside of the sandbox, but there are two pre-conditions: First, the instructions should be issued by the plugin/control process; second, the instruction should belong to the pre-defined set of communication instructions, only when both pre-conditions are met, the instruction can be let out, so that the security of the system is guaranteed. Of course, in the above implementation, in addition to defining the communication instruction set, the purpose can also be realized by other means, such as the pipeline mechanism etc., here we will not go into details.

In specific implementation, these instructions that can be sent outside the sandbox may include a variety of situations. For example, because the page corresponds to the plugin/control, in order to ensure the correctness of the operation, if the plugin in an independent process wants to perform an event, it is necessary to place the corresponding script into the page thread which created the plugin/control process, and run the script in this page thread. To this end, the plugin/control process can also maintain a mapping between the main window of the plugin/control and the page thread to ensure that the page thread corresponds to the plugin/control thread. When the plugin/control process needs to run a script, the corresponding page thread can be found through the mapping and then the script can be put into the page thread to run. Obviously, when the plugin/control process sends a message mentioned above, the message should be let out, which means the message is allowed to be sent to a page thread outside the sandbox. This message can be written to the communication instruction set.

In addition, since the plugin/control process is running in the sandbox, in order to present the interface content which are relevant to the plugin/control process to the user, the interface-related content, display location, size and other data should be sent to the corresponding browser page process by plugin/control process, and the interface display results can be drawn by the browser page process (specifically, the page process can call the IViewObject::Draw method of the plugin/control processes to complete the draw and display of the plugin/control object content), so that users will be able to see the relevant interface display results. Again, such drawing message sent by the plugin/control process also can be let out from the sandbox, and the message may be written to the communication instruction set.

It should be noted that, not all the plugin/control are allowed to be independent with the page process in practice, for example, a number of online banking controls, which may not achieve the corresponding functions if placed into another process independent with the page process. Therefore, in the specific implementation, only some plugins/controls with strong independence such as player, flash etc., or the plugins/controls which do not affect the specific function realizations after becoming independent from the plugin/control process, can be implemented by utilizing embodiments of the invention, and other plugins/controls still can be implemented with the prior arts.

In short, by the method for browsing the webpage provided by the embodiments of the invention, making the plugin/control process independent from the page process, and furthermore placing the plugin/control process into the sandbox to run in real time, therefore avoiding the unresponsive phenomena of browser page caused by plugin/control getting stuck or crashing, while guaranteeing the surfing safety of Internet users, and finally enhancing the running stability of the browser.

Figure 2:
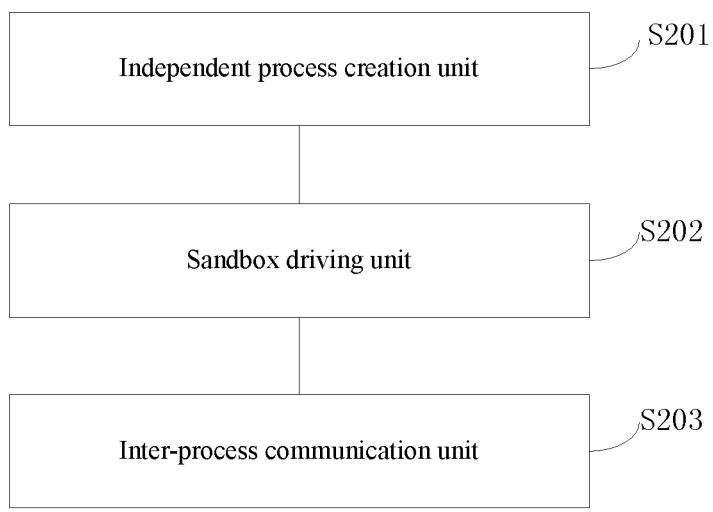
FIG. 2 shows schematically a schematic view of a device according to one embodiment of the invention.

Corresponding to the method for browsing the webpage provided by the embodiments of the invention, the present invention further provides a device for browsing webpage. Referring to FIG. 2, which device may include:

Independent process creation unit 201, configured to create a plugin/control process which is independent from a page process for a plugin/control object when a page thread creates the plugin/control object;

Sandbox driving unit 202, configured to place the independent plugin/control process into the sandbox to run;

Inter-process communication unit 203, configured to browse a webpage by implementing inter-process communication between the plugin/control process and the page process, wherein the page process runs outside the sandbox.

Wherein the Inter-process communication unit 203 particularly includes:

A first communication sub-unit, configured to create a main window object and a browser host object in the independent plugin/control process, and connect the browser host object to the main window object, so that the page process can send messages to the plugin/control process via the main window.

In the specific implementation, the first communication sub-unit particularly configured to:

Make the page process send messages of mouse, keyboard and other response events to the plugin/control process via the main window.

Or, the Inter-process communication unit 203 may also include:

A second communication sub-unit, configured to judge whether the instruction is issued by the plugin/control process and belongs to the preset communication instruction set when the plugin/control process in sandbox needs to send instructions to the outside of the sandbox. If so, let out the instruction so that the plugin/control process can send messages to the page process.

In the specific implementation, the second communication sub-unit particularly configured to:

When the plugin/control processes have script to call, forward the script to the page thread which creating the plugin/control process;

Or,

When the plugin/control process creates drawing event, send the data corresponding to the drawing event to the corresponding page process.

By mean of the device for browsing webpage provided by the embodiment of the invention, making the plugin/control independent from the page process, and furthermore placing the plugin/control process into the sandbox to run in real time, therefore avoiding the unresponsive phenomena of browser page caused by the plugin/control getting stuck or crashing, while guaranteeing the surfing safety of internet users, and finally enhancing the running stability of the browser.

Embodiments of the individual components of the invention may be implemented in hardware, or in a software module running on one or more processors, or in a combination thereof. It will be appreciated by those skilled in the art that, in practice, some or all of the functions of some or all of the components in the device for browsing webpage according to individual embodiments of the invention may be realized using a microprocessor or a digital signal processor (DSP). The invention may also be implemented as a device or an apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 3:
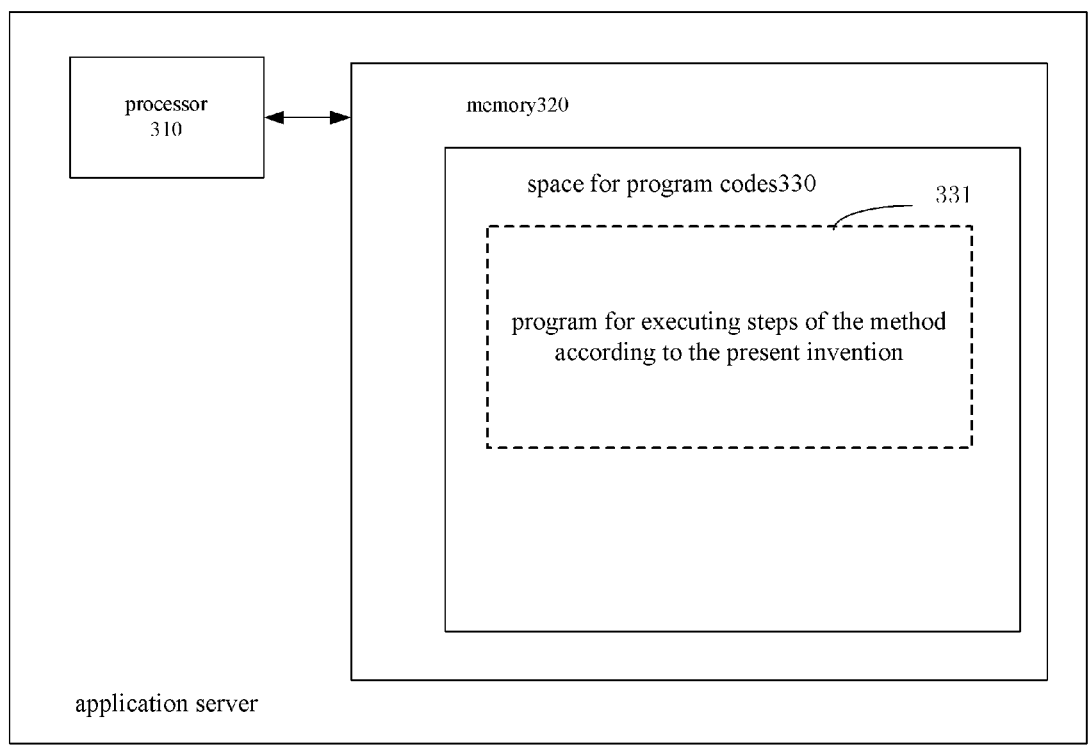
FIG. 3 shows schematically a block diagram of a server for implementing the method according to the invention.
Figure 4:
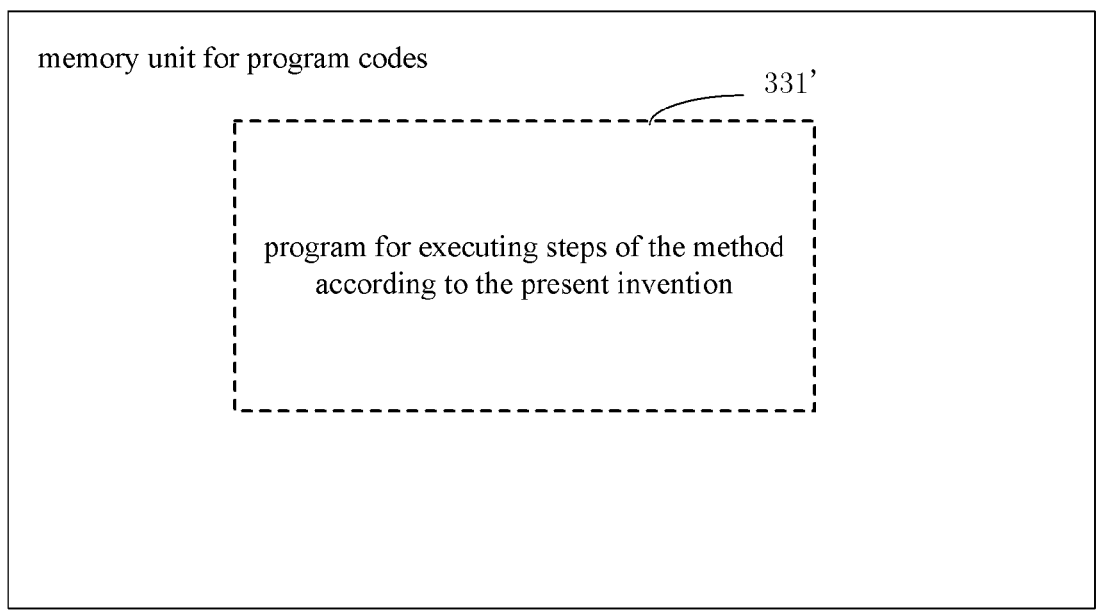
FIG. 4 shows schematically a storage unit for retaining or carrying the program code implementing the method according to the invention.

For example, FIG. 3 shows a server which may carry out the method for browsing the webpage according to the present disclosure, e.g., an application server. The server conventionally includes a processor 310 and a computer program product or computer readable media in the form of a memory 320. The memory 320 may be an electronic memory such as a flash memory, an EEPROM (electrically erasable programmable read only memory), an EPROM, a hard disk or a ROM or the like. The memory 320 has a memory space 330 for a program code 331 for executing any method steps of any one of the methods described above. For example, the memory space 330 for a program code may include individual program codes 331 which is used to execute individual steps in the method above respectively. Those program codes may be read out from or written to one or more computer program products. These computer program products includes such a program code vectors as a hard disk, a compact disk (CD), a memory card or a floppy disk. Such a computer program product is generally a portable or a stationary storage as described with reference to FIG. 4. The storage unit may have a memory segment and a memory space, etc. which is arranged similar to the memory 320 in the server referred to FIG. 3. The program code may for example be compressed in a suitable form. In general, the storage unit includes a computer readable code 331', namely which may be readable by processor such as processor 310, when run by a server, these codes will cause the server to carry out individual steps in the method described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the description.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. The usage of the words such as first, second, and third, etc. does not mean any ordering. Such words may be construed as naming.

Furthermore, it is also to be noted that the language used in the description is selected mainly for the purpose of readability and teaching, but not selected for explaining or defining the subject matter of the disclosure. Therefore, for those of ordinary skilled in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A method for browsing a webpage, comprising:
creating a plugin/control process which is independent from a page process for a plugin/control object when a page thread creates the plugin/control object;
placing the independent plugin/control process into a sandbox to run; and
browsing a webpage by implementing inter-process communication between the plugin/control process and the page process, wherein the page process runs outside the sandbox;
wherein the implementing the inter-process communication between the plugin/control process and the page process comprises:
creating a main window object and a browser host object in the independent plugin/control process, and connecting the browser host object to the main window object, so that the page process sends messages of mouse, keyboard, and other response events to the plugin/control process via the main window.

2. The method according to claim 1, wherein the implementing the inter-process communication between the plugin/control process and the page process comprises:
determining whether the instruction is sent from the plugin/control process and belongs to a preset communication instruction set when the plugin/control process in the sandbox needs to send an instruction outside of the sandbox, and, if yes, letting the instruction out of the sandbox so that the plugin/control process can send messages to the page process.

3. The method according to claim 2, wherein the plugin/control process sending messages to the page process comprises one of:
when the plugin/control process has a script to call, forwarding the script to the page thread that creates the plugin/control process; and
when the plugin/control process creates a drawing event, sending the data corresponding to the drawing event to the corresponding page process.

4. A device for browsing a webpage, comprising:
a memory having instructions stored thereon; and
a processor to execute the instructions to perform operations for browsing a webpage, the operations comprising:
creating a plugin/control process which is independent from a page process for a plugin/control object when a page thread creates the plugin/control object;
placing the independent plugin/control process into a sandbox to run; and
browsing a webpage by implementing inter-process communication between the plugin/control process and the page process, wherein the page process runs outside the sandbox;
wherein the implementing the inter-process communication between the plugin/control process and the page process comprises:
creating a main window object and a browser host object in the independent plugin/control process, and connecting the browser host object to the main window object, so that the page process sends messages of mouse, keyboard, and other response events to the plugin/control process via the main window.

5. The device according to claim 4, wherein the implementing the inter-process communication between the plugin/control process and the page process comprises:
determining whether the instruction is issued from the plugin/control process and belongs to a preset communication instruction set when the plugin/control process in the sandbox needs to send an instruction outside of the sandbox, and, if yes, letting the instruction out of the sandbox so that the plugin/control process can send messages to the page process.

6. The device according to claim 5, wherein the plugin/control process sending messages to the page process comprises one of:
- when the plugin/control process has a script to call, forwarding the script to the page thread that creates the plugin/control process; and
- when the plugin/control process creates a drawing event, sending the data corresponding to the drawing event to the corresponding page process.

7. A non-transitory computer readable medium comprising instructions stored thereon that, when executed by a computing device causes the computing device to perform operations for browsing a webpage, the operations comprising:
- creating a plugin/control process which is independent from a page process for a plugin/control object when a page thread creates the plugin/control object;
- placing the independent plugin/control process into a sandbox to run; and
- browsing a webpage by implementing inter-process communication between the plugin/control process and the page process, wherein the page process runs outside the sandbox;
- wherein the implementing the inter-process communication between the plugin/control process and the page process comprises:
- creating a main window object and a browser host object in the independent plugin/control process, and connecting the browser host object to the main window object, so that the page process sends messages of mouse, keyboard, and other response events to the plugin/control process via the main window.

* * * * *